United States Patent [19]
Rudolph

[11] Patent Number: 5,711,255
[45] Date of Patent: Jan. 27, 1998

[54] ANIMAL COLLAR WITH INTEGRAL LEAD

[76] Inventor: Stewart S. Rudolph, 61-49 Dry Harbor Rd. K-10, Middle Village, N.Y. 11379

[21] Appl. No.: 529,586

[22] Filed: Sep. 18, 1995

[51] Int. Cl.$^6$ .................................................. A01K 27/00
[52] U.S. Cl. .......................................... 119/793; 119/864
[58] Field of Search .................................. 119/792, 793, 119/856, 864, 907, 855, 770

[56] References Cited

U.S. PATENT DOCUMENTS

| | | | |
|---|---|---|---|
| 3,817,218 | 6/1974 | Bongiovanni | 119/864 |
| 3,995,598 | 12/1976 | Gardner et al. | 119/864 |
| 4,384,548 | 5/1983 | Cohn | 119/792 X |
| 5,456,213 | 10/1995 | Beauchamp | 119/864 X |
| 5,465,689 | 11/1995 | Winder | 119/654 |
| 5,497,733 | 3/1996 | Hull et al. | 119/864 X |
| 5,540,488 | 7/1996 | Heinrichs | 119/770 |

FOREIGN PATENT DOCUMENTS

1228581 A  4/1971  United Kingdom ............... 119/793

Primary Examiner—Gene Mancene
Assistant Examiner—Yvonne R. Abbott
Attorney, Agent, or Firm—Darby & Darby

[57] ABSTRACT

A collar or harness for an animal comprising a first loop sized and shaped to be secured around the neck of the animal. A second loop is attached to the first loop at a securing point. The second loop is selectively movable between a stowed position wherein the second loop is located around the neck of the anal, adjacent to the first loop, and a usable position wherein the releasable portion of the second loop is located remote of the securing point so that the second loop may function as a lead.

19 Claims, 5 Drawing Sheets

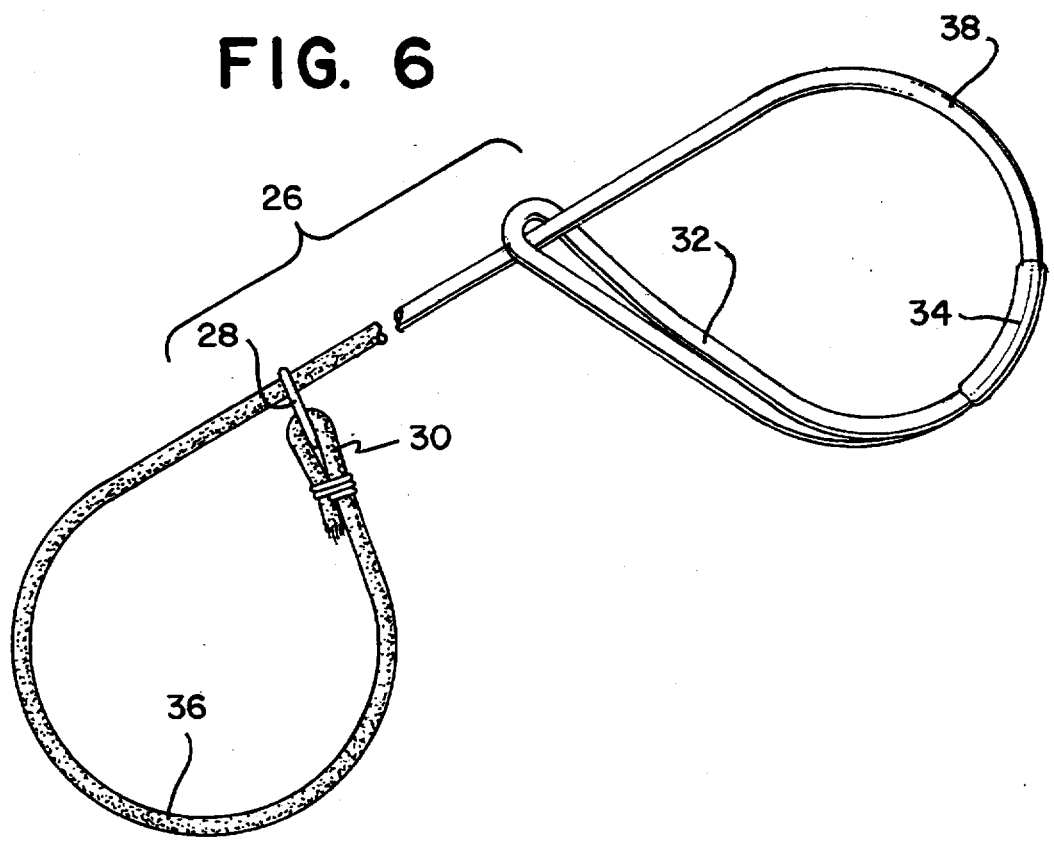
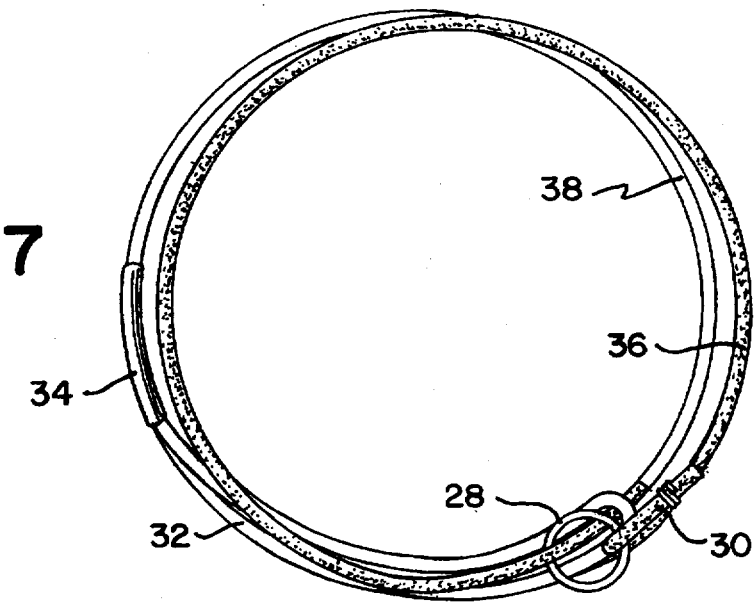

ANIMAL COLLAR WITH INTEGRAL LEAD

FIELD OF THE INVENTION

This invention relates generally to collars of the type adapted to be secured about the neck of an animal for controlling or otherwise restraining the animal without injury, and more particularly, to such collars including integral leashes for providing greater control of the animal.

BACKGROUND OF THE INVENTION

Owner's of pet animals (in particular, those of domesticated pets) can appreciate the value of providing freedom of movement to their pet whenever possible, for example, during walks and runs. Pet owners therefore often allow their pets to run around, unconfined and without a controlling tether or leash; merely donning a collar around their neck. In such instances, should it become necessary to control the pet against chasing or attacking a person or another animal, the owner commands the pet to retreat or otherwise halt. Once the pet is reachable, the owner may hold the pet against further advancement by gripping the collar until the object of interest (person or other animal) leaves the area. Depending on the type of collar and the type and size of animal being restrained, it may be difficult for the owner to find and grab the collar, especially if the pet has thick hair or fur around the neck area, such as the case with a collie or a chow. Furthermore, if the type of collar used is a choke-type collar, the owner must grab only the connecting eyelet portion of the collar, otherwise the collar will effectively loosen allowing the animal to easily free itself.

As an alternative, or subsequent to grabbing hold of the pet's collar, the owner may secure a leash to the collar and escort his pet away from the area. The leash which is carried by the owner includes a relatively small securing clip. To secure the pet with the leash, the owner must hold the pet by the collar with one hand and maneuver the securing clip onto a small ring located on the collar using the other hand. Securing the leash to an excited pet, such as a large dog, can prove to be a difficult task, especially if the owner's hands are already in use, such as when carrying an object, for example, an umbrella or package.

It is an object of the present invention to provide a simple effective device which overcomes the deficiencies of the prior art.

It is a second object of the present invention to provide a collar for a pet which includes an integral leash which is easily accessible.

It is another object of the invention to provide such an integral collar/leash which includes few moving parts and is easy to implement using a single hand and easy and inexpensive to manufacture.

SUMMARY OF THE INVENTION

The present invention is directed to a combination collar and leash for an animal. The device includes a first loop which is sized and shaped to be secured around the neck of the animal. A second loop is attached to the first loop at a securing point and defines a releasable leash portion. The second loop is selectively movable between a stowed position wherein the second loop is located around the neck of the animal, adjacent to the first loop, and a usable position wherein the releasable portion of the second loop is located remote of the securing point so that the second loop may be extended to function as a lead.

BRIEF DESCRIPTION OF THE DRAWINGS

The foregoing and other features of the present invention will be more readily apparent from the following detailed description and drawings of illustrative embodiments of the invention in which:

FIG. 6 is a sectional plan view of the collar/lead of FIG. 5 in an intermediate position, in accordance with the invention;

FIG. 7 is a plan view of the collar/lead of FIG. 6 in a stowed position;

DETAILED DESCRIPTION OF THE PREFERRED EMBODIMENT

Figure 1:
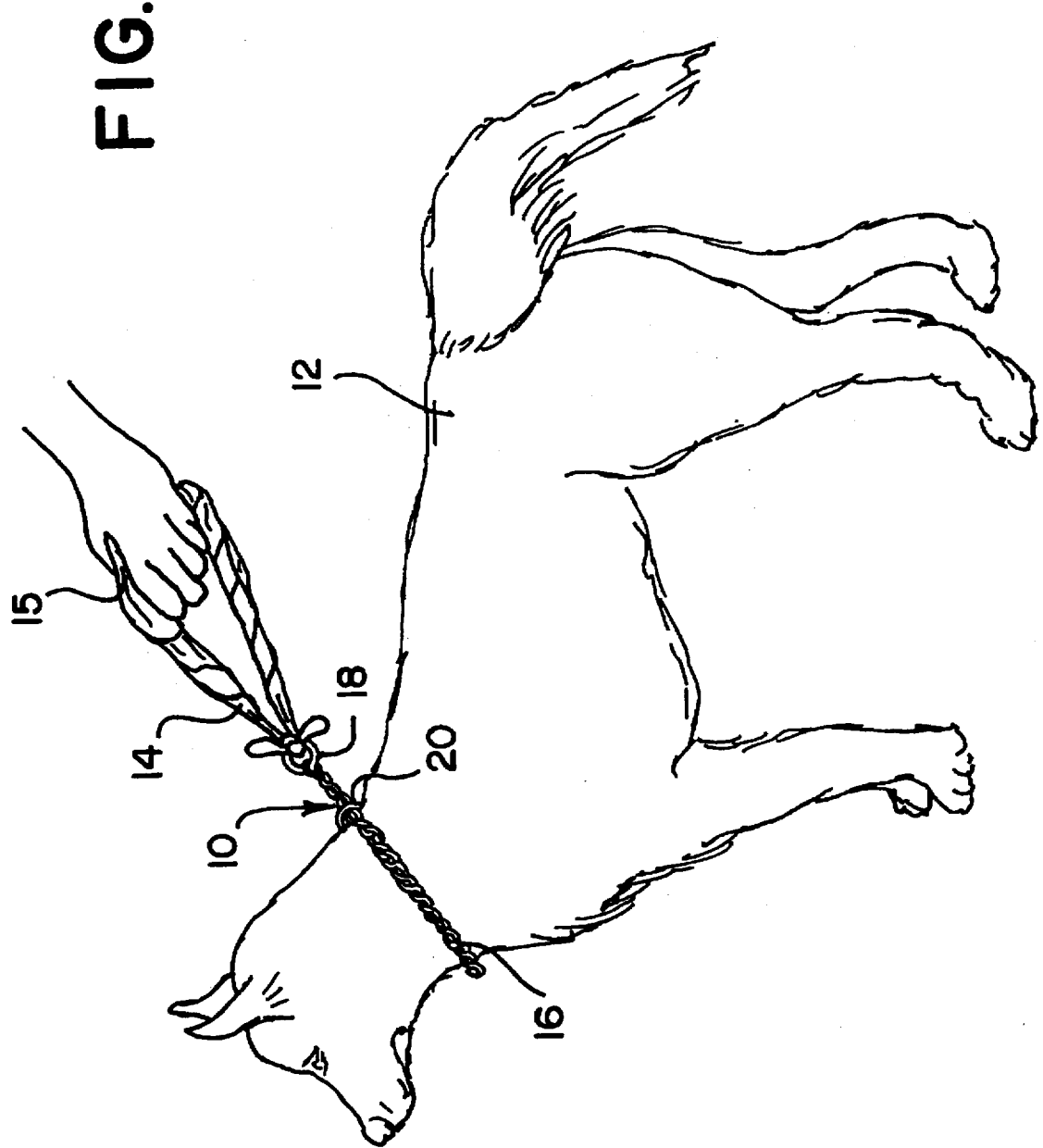
FIG. 1 is a side view of a representative pet dog showing a choke-type collar in place around the neck of the dog and including a single loop lead portion, in accordance with a first embodiment of the present invention.

Referring to FIG. 1, a collar 10, in accordance with a first embodiment of the present invention, is shown positioned around the neck of a dog 12. Attached to the collar is a lead loop 14. In the example shown in FIG. 1, the type of collar 10 illustrated is a choke-type collar and therefore includes a length of chain 16 having a securement ring 18 and a slip ring 20. The lead loop 14, in this particular embodiment, is a simple loop of wound fabric, such as a rolled bandanna, which is knotted (or otherwise secured e.g. by stitching) onto the securement ring 18 of the choke collar 10. The securement ring 18 defines a securement point. A releasable portion 15 defines essentially any point along the lead loop 14 other than the securement point which may be grabbed by the owner's hand and withdrawn from the neck of the dog. The lead loop 14 is shown in a usable position, functioning effectively as a leash or a controlling lead.

Figure 2:
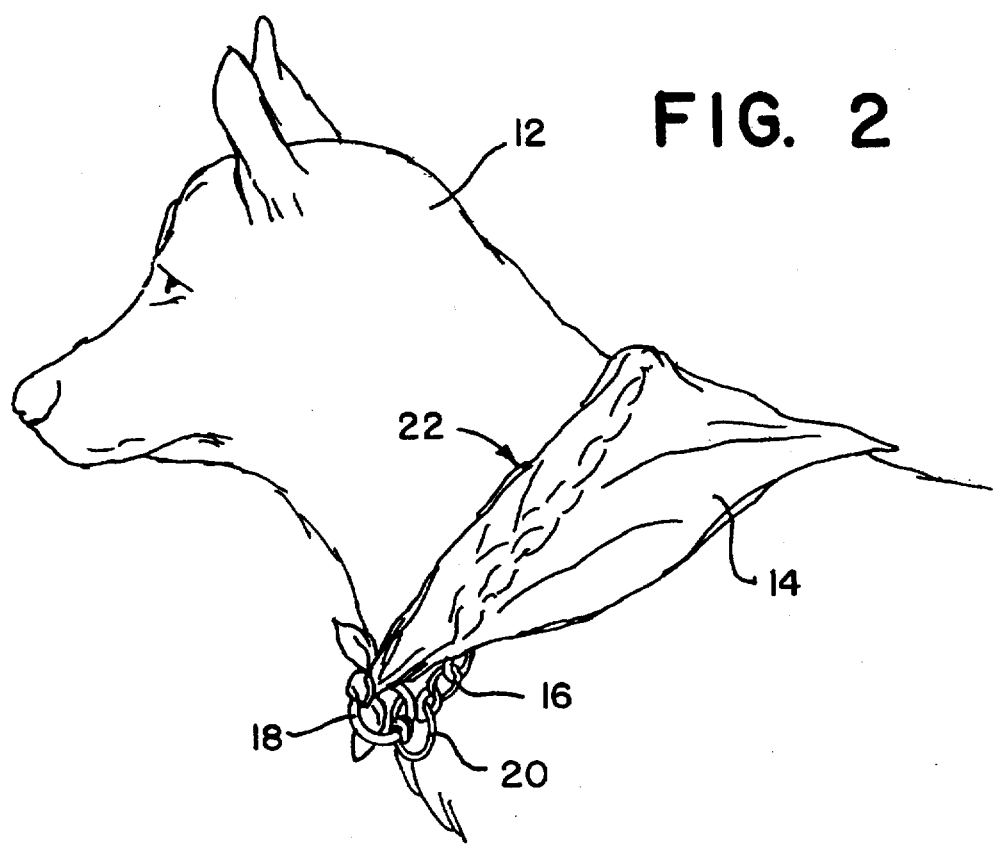
FIG. 2 is a side partial view of the dog of FIG. 1, showing the choke-type collar and the lead located in a stowed position around the neck of the dog, in accordance with the invention.
Figure 3:
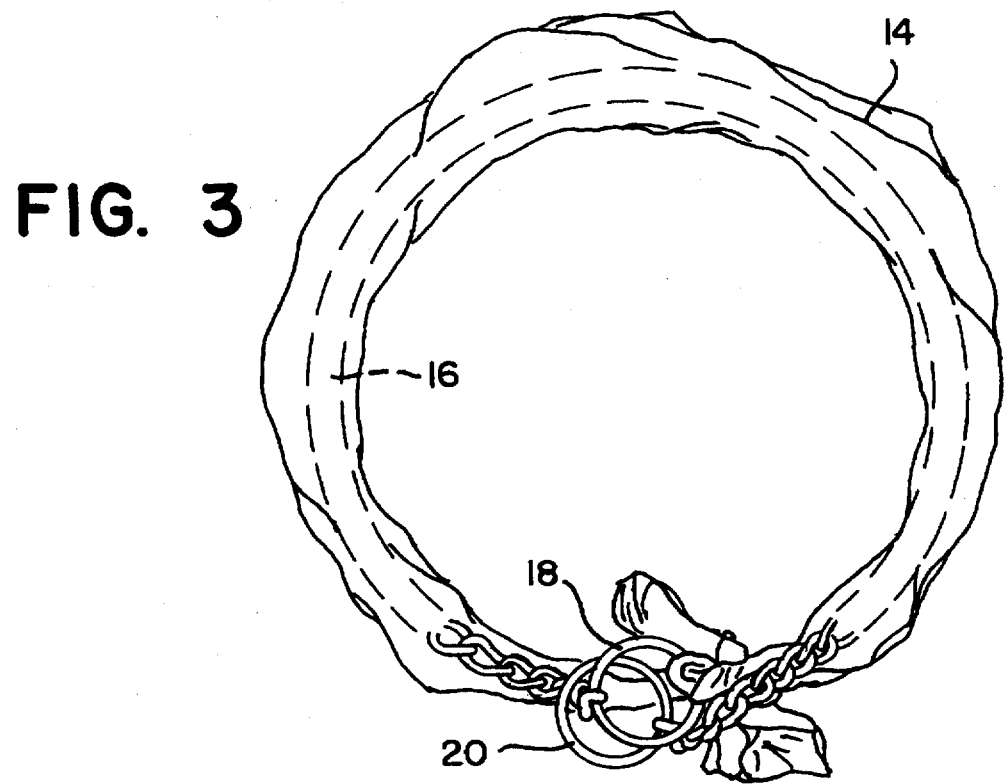
FIG. 3 is a plan view of the choke-type collar and the lead located in the stowed position (shown without the dog, for clarity) as in FIG. 2, in accordance with the invention.

As shown in FIGS. 2 and 3, the lead loop 14 is shown in a stowed position around the neck of the dog 12 so that whenever possible during a walk or run, the dog carries the lead in a comfortable, unobtrusive, yet easily accessible manner around the neck until it is needed to control the dog. Since the dog carries the lead with him, once the owner reaches the dog, should it become necessary to control the dog, the owner may quickly and easily access the releasable portion 15 of the lead loop 14, using a single hand, and either control the dog by holding the lead loop 14 in the stowed position (shown in FIG. 2) or manipulate the lead loop 14 to cause it to be removed from the dog's head so that it lies in the usable position, as discussed below. In such a case the lead loop 14 becomes an elongated member which may be easily grasped and used as a lead.

In operation, the choke-type collar 10 is manipulated as is known so that the chain link portion 16 is looped through the slip ring 20 until the slip ring 20 and the securement ring 18 contact each other. The resulting collar loop 22 is positioned around the neck of the dog 12. The lead loop 14 is sized and shaped so that it may be moved between the stowed and usable positions, while remaining secured to the securement ring 18. The lead loop 14 may at any time be drawn over the dog's head from the stowed position to the usable position so that it may be used as a controlling lead. When in the stowed position, the lead loop 14 may be used to offer a comfortable form of decoration for the dog.

Although the collar 10 described in the first embodiment of this invention and shown in FIGS. 1–3 is a choke-type collar, all the collars described in this patent application may be any type of rigid, flexible, fixed or adjustable type collar without departing from the invention and will hereinafter be collectively referred to as collar.

Figure 4:
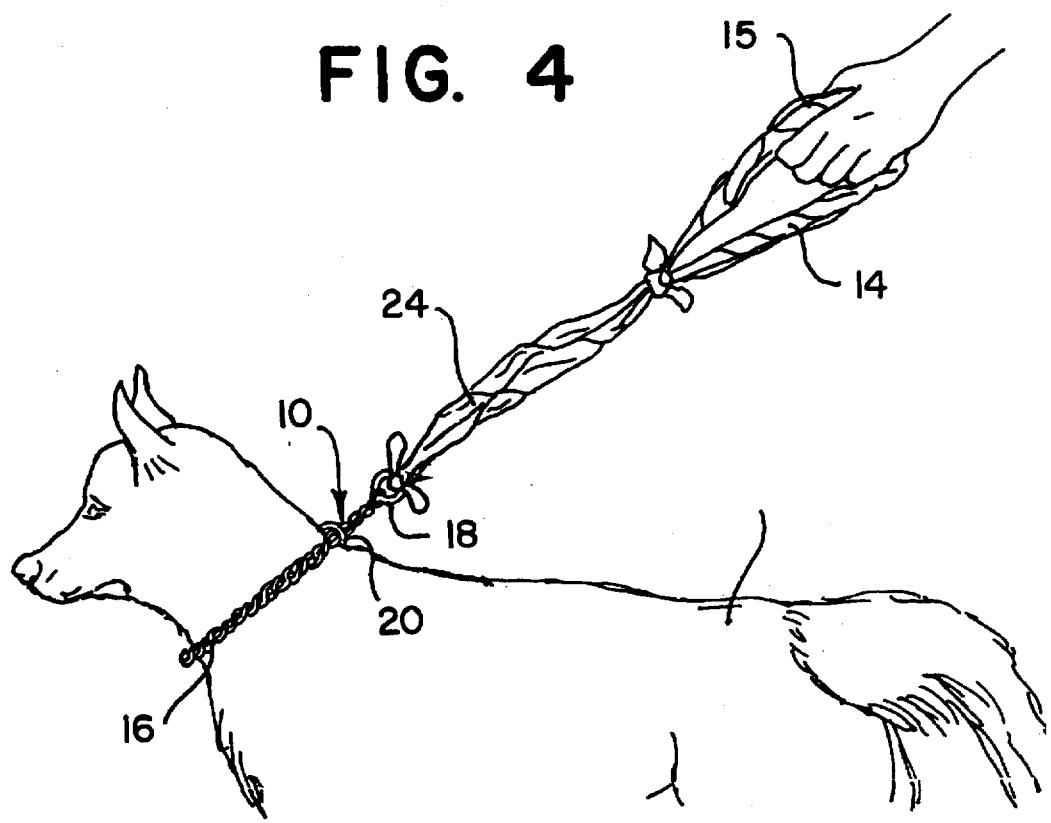
FIG. 4 is a side view of the dog of FIG. 1, showing a choke-type collar in place around the neck of the dog and including a double loop lead portion located in a usable position, in accordance with a second embodiment of the present invention.

In accordance with another embodiment of the invention, as shown in FIG. 4, a collar/lead arrangement includes a collar portion 10, and like the embodiment shown in FIGS. 1–3, described above, includes a lead loop 14 and a extender loop portion 24. In this embodiment, the extender loop portion 24 is connected between the lead loop 14 and the securement ring 18. The purpose of the extender loop portion 24 is to extend the overall length of the lead when the lead loop 14 and the extender loop portion 24 are in the usable position, as shown in FIG. 4.

In operation of the second embodiment of FIG. 4, the extender loop portion 24 is first placed around the head of the dog 12 so that it lies adjacent to the collar 10 around the dog's neck. The lead loop 14 is then positioned similarly around the dog's neck so that both loop portions are carried by the dog 12. In use, both the extender loop 24 and the lead loop 14 are removed from the dog's neck, and, depending how long a lead is desired by the owner to control the dog, either both loops are held as one to provide a short lead, or only the lead loop 14 is held to provide a longer overall lead.

Figure 5:
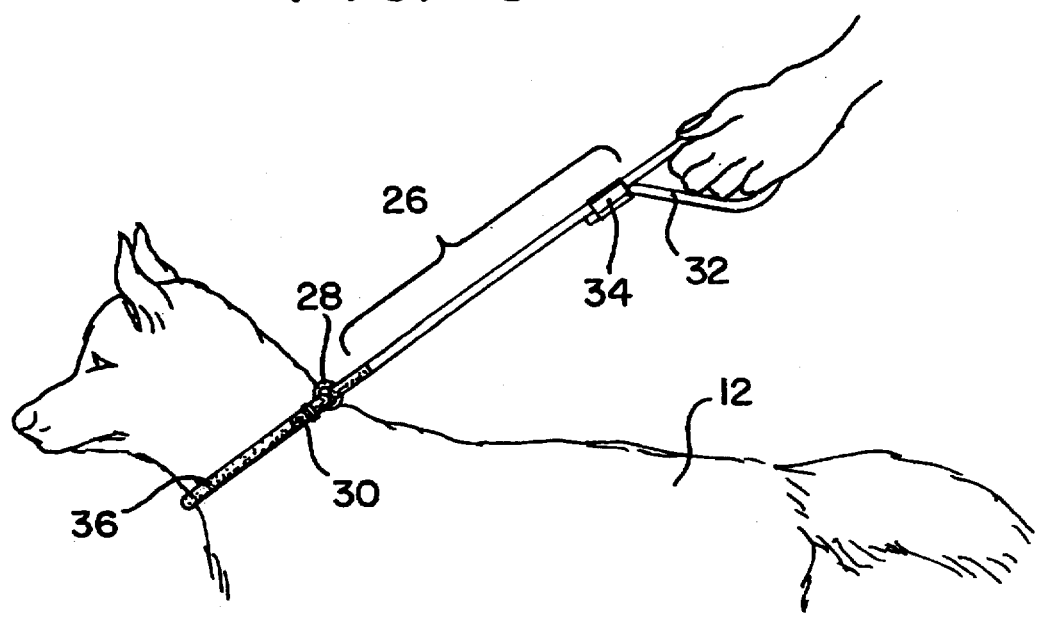
FIG. 5 is side view of the dog of FIG. 1 showing a collar/lead located in a usable position, in accordance with a third embodiment of the invention.

A third embodiment of the invention is shown in FIGS. 5–7 including a single-piece lead 26 which includes a slip ring 28 at a collar end 30 and a handle 32 at a handle end 34. The handle 32 is shown as a "loop" but should not be confused with the lead loop 14 described in the earlier embodiments. The handle 32 functions similar to a slip ring of a choke-type collar as illustrated in FIG. 6.

In operation, a portion of the lead 26 at the collar end 30 is drawn through the slip ring 28 to form a choke-type collar loop 36, similar to a conventional choke-type collar except in this embodiment the equivalent chain portion of the choke collar is formed integral with the lead thereby obviating the securement ring 18. Similarly, a portion of the same lead 26 at the handle end 34 is drawn through the handle loop 32 to form a lead loop 38 as shown in FIG. 6. The collar loop 36 may be placed around the neck of a dog (or other animal) to function as a choke-type collar. Similarly, the lead loop 38 may be placed into a stowed position around the neck of the dog until needed. The overlapping collar loop 36 and the lead loop 38 are shown in FIG. 7, as they would appear about the neck of a dog. It is preferred that the both the lead loop 38 and the collar loop 36 be sized to accommodate the head and neck portion of the particular dog.

Applicant has determined that the ideal length of the entire lead 26 is equal to approximately twice the length of the collar loop (measured along the circumference).

Furthermore, the lead loop 38 is preferably colored or otherwise made distinguishable with respect to both the dog (i.e., the dog's hair color) and the collar loop 36. For example, the lead loop may be brightly colored so that when needed, just the lead loop 38 may be withdrawn from the neck and head of the dog to the usable position. Once withdrawn from the dog's neck, the lead loop 38 may be further straightened so that the lead extends to its full length.

Figure 8:
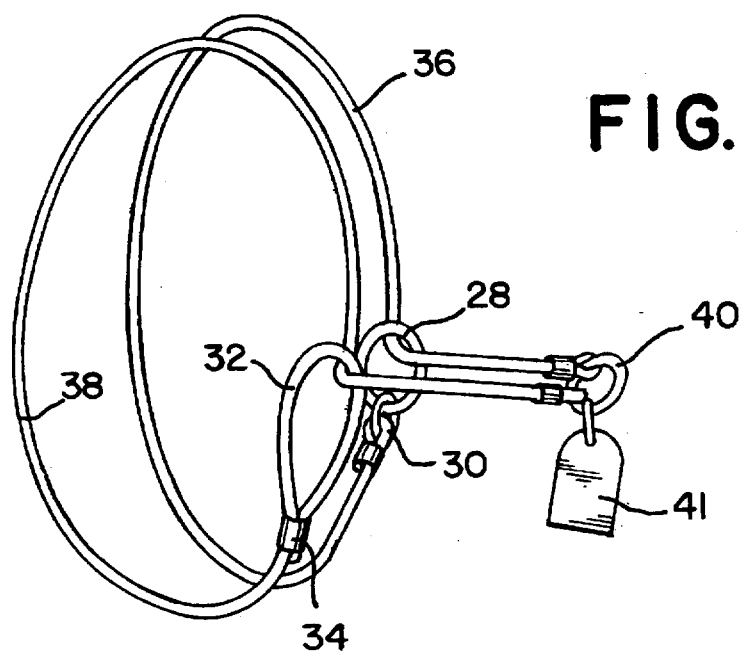
FIG. 8 is perspective view of a collar/lead in a stowed position, in accordance with another embodiment of the invention.
Figure 9:
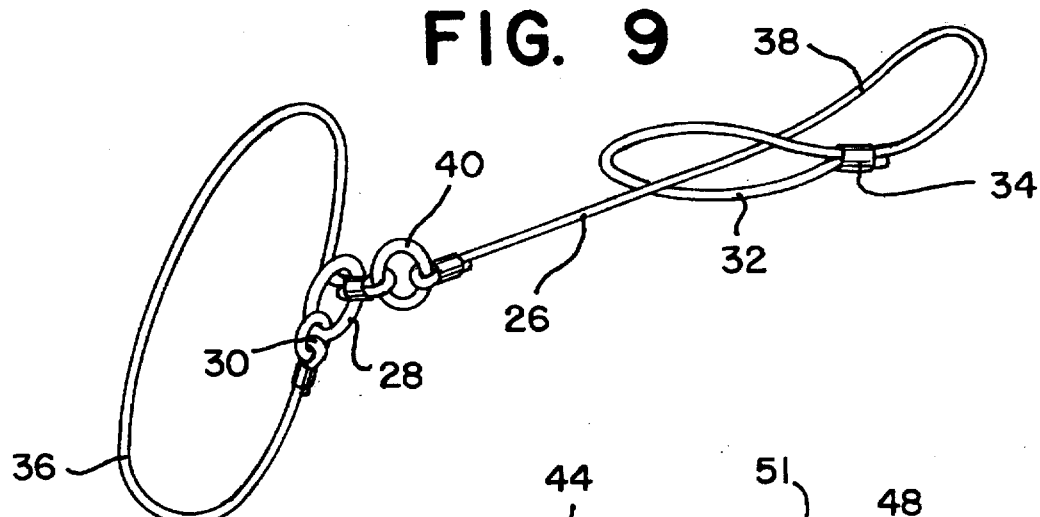
FIG. 9 is a perspective view of the collar/lead in an intermediate position, in accordance with the invention.

A fourth embodiment, as shown in FIGS. 8 and 9, is essentially equivalent to the lead/collar assembly shown in the previously described embodiment and shown in FIGS. 5–7 with the inclusion of a securement ring 40 as shown. The securement ring 40 is preferably located at the midpoint of the entire lead 26 (i.e., at the point where the lead becomes a choke collar). The securement ring 40 functions similar to the securement ring 18 of a conventional choke-type collar 10 so that when the lead loop 38 is in the stowed position, and an additional leash or lead (not shown) is connected to the securement ring 40, both the collar loop 36 and the lead loop 38 will function as independent choke collars. Furthermore, the securement ring 40 may be used to secure an information tag 41.

Figure 10:
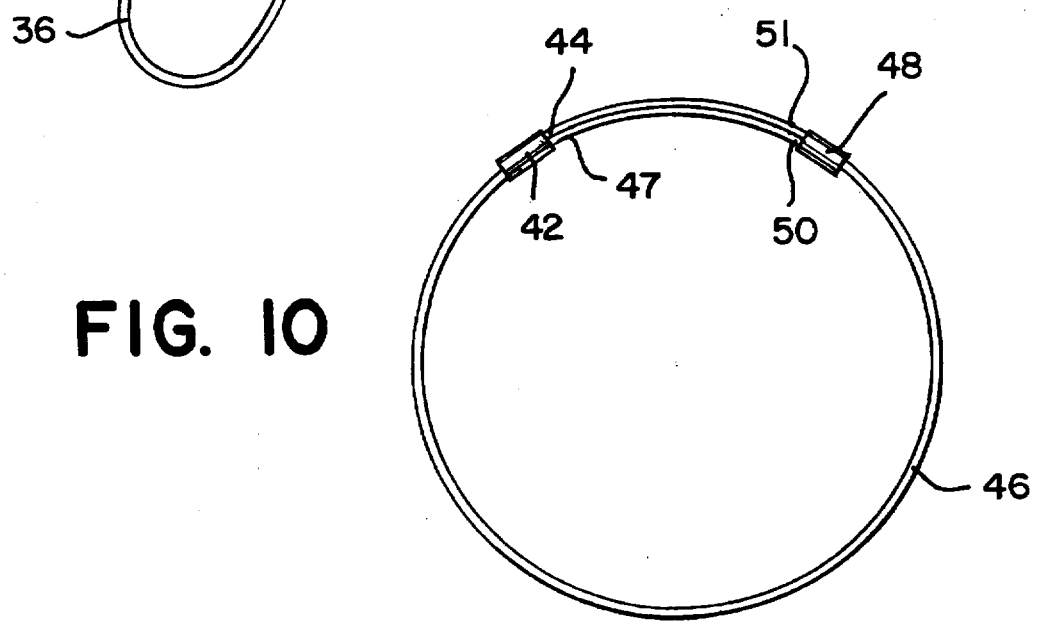
FIG. 10 is a plan view of an exemplary loop having adjustment means, in accordance with the invention.

FIG. 10 illustrates a simple adjustment mechanism which may be employed with the lead loop in any of the above-described embodiments to allow the loop to be appropriately adjusted about the dog's neck to a proper unobtrusive fit and lengthened when the lead loop is located in the usable position. In operation, a first slip clamp 42 is fixed to a first end 44 of a representative lead element 46 and slidably surrounds a first adjacent overlapping section 47 of the lead element 46 while a second slip clamp 48 is secured to the other end 50 of the lead element 46 and similarly, slidably surrounds a second adjacent overlapping section 51 of the lead element 46. Movement of the first and second slip clamps 42, 48 with respect to each other dictates the corresponding size of the loop formed by the lead element 46.

While the invention has been particularly shown and described with reference to preferred embodiments thereof, it will be understood by those skilled in the art that various changes in form and details may be made therein without departing from the spirit and scope of the invention.

What is claimed is:

1. A collar for an animal comprising:
   a first loop sized and shaped to be secured around the neck of the animal, and
   a second loop having a size sufficient to fit over the head and around the neck of the animal, said second loop being attached to said first loop at a securing point, said second loop being movable about the head of the animal between a stowed position wherein said second loop can be located around the neck of the animal, adjacent to said first loop, and a usable position wherein said second loop can be located remote of the neck of the animal so that said second loop may function as a lead, said second loop being a bandanna which is made from a soft flexible textile.

2. The collar according to claim 1, wherein said securing point comprises a metal ring.

3. The collar according to claim 1, wherein said first loop includes means to adjust the effective circumference.

4. The collar according to claim 1, wherein said first loop is a choke-type collar including a slip ring and a securement ring, wherein said securement ring is located at said securing point.

5. The collar according to claim 4, wherein said second loop is secured to said securement ring.

6. The collar according to claim 1, wherein said first and second loops are integrally formed from a single piece of elongated material.

7. The collar according to claim 1, wherein said second loop includes means to adjust the effective length of its circumference so that said second loop may be adjusted to fit around said neck.

8. A harness for an animal comprising:

a collar sized to fit around the neck of said animal;

an elongated cord having a length and defining a looped handle portion at one end and being connected to the collar at the other end, a lead loop being formed in the cord by a section of the cord extending through the looped handle, said lead loop being movable between a stowed position wherein said lead loop can be positioned about the neck of said animal, and a usable position wherein said lead loop can be reduced in size to lengthen the cord so it can function as a lead to restrain said animal.

9. A collar for an animal comprising:

a first loop sized and shaped to be secured around the neck of the animal;

a second loop having a size sufficient to fit over the head and around the neck of the animal, said second loop being attached to said first loop at a securing point, said second loop being movable about the head of the animal between a stowed position wherein said second loop can be located around the neck of the animal, adjacent to said first loop, and a usable position wherein said second loop can be located remote of the neck of the animal so that said second loop may function as a lead; and an extender loop securing said second loop to said first loop, said extender loop being movable between said stowed position and said usable position.

10. The collar according to claim 9, wherein said securing point comprises a metal ring.

11. The collar according to claim 9, wherein said first loop includes means to adjust the effective circumference.

12. The collar according to claim 9, wherein said first loop is a choke-type collar including a slip ring and a securement ring.

13. The collar according to claim 12, wherein said second loop is secured to said securement ring.

14. The collar according to claim 9, wherein said second loop is made from a soft flexible material.

15. The collar according to claim 14, wherein said flexible material is plastic.

16. The collar according to claim 14, wherein said flexible material is rubber.

17. The collar according to claim 14, wherein said flexible material is a woven textile.

18. The collar according to claim 17, wherein said woven textile material is a bandanna.

19. The collar according to claim 9, wherein said first and second loops are integrally formed from a single piece of elongated material.

* * * * *